P. CROSBY.
Re-Sawing Machine.
No. 130.
Reissued Mar. 10, 1849.
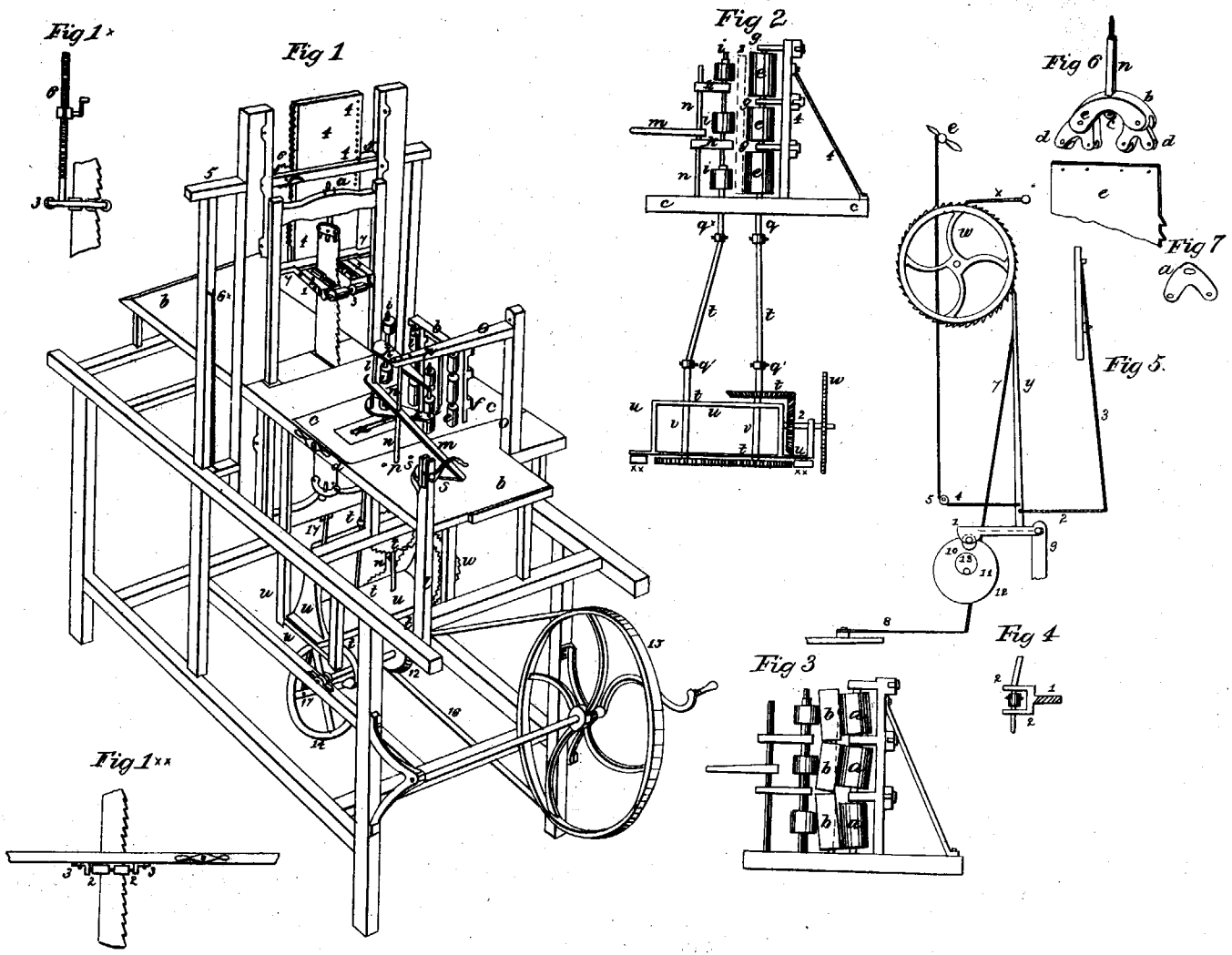
N. PETERS, PHOTO-LITHOGRAPHER, WASHINGTON, D. C.

UNITED STATES PATENT OFFICE.

PEARSON CROSBY, OF FREDONIA, NEW YORK.

IMPROVEMENT IN SAW-MILLS FOR RESAWING BOARDS AND OTHER TIMBER.

Specification forming part of Letters Patent No. 2,321, dated November 3, 1841; Reissue No. 130, dated March 10, 1849.

*To all whom it may concern:*

Be it known that I, PEARSON CROSBY, of Fredonia, Chautauqua county, and State of New York, have invented certain new and useful Improvements in Saw-Mills for Resawing Boards and other Timber; and I do hereby declare that the following is a full, clear, and exact description of the principle or character which distinguishes them from all other things before known, and of the manner of making, constructing, and using the same, reference being had to the accompanying drawings, making part of this specification, in which—

Figure 1 is a perspective view of the machine; Fig. 2, a vertical section of the apparatus for gaging, presenting, and feeding the boards; and Fig. 3, a vertical section of a modification thereof.

The other figures, representing some of the details, will be referred to hereinafter, but in all the figures the same letters indicate like parts.

In saw-mills as constructed prior to my invention the lumber to be sawed is presented to the saw and carried by a carriage moving with the lumber, the ends of the piece of lumber resting on the head and tail blocks of the said carriage, and adjustable thereon or therewith to determine the thickness of the boards to be sawed. This plan, however, while it occupies much room and requires much power to move it, is not adapted to the purpose of resawing or slitting boards with accuracy, as it makes no adequate provision for guiding the board to determine the thickness along its length, which from its pliability will yield and make the cut of unequal thickness. Another mode adopted and essayed before the date of my invention is to clamp or otherwise secure the board to a carriage moving along by the side of the saw; but this, although better adapted to the purpose than the preceding, is objectionable for many reasons not necessary to enumerate. By my improved method, in which I dispense entirely with the use of a carriage, although one may be used in connection therewith, the board to be resawed or slitted is presented and guided to the saw by means of a vertical rest placed in front of the saw, and as the board is moved forward by feed-rollers or other means the rest guides the plank and gages the thickness to which it is to be sawed, while the means employed to press the board against the rest is made to yield to the inequalities of the thickness.

The principle or character of the first part of my invention consists in the method of presenting the board to the action of the slitting-saw by pressing it against a rest by means of a pressure roller or rollers, or the equivalent or equivalents thereof, whether the rest be made adjustable or not, and the pressure roller or rollers or their equivalent be made to press against the board or plank by means of a weighted lever or equivalent means that it or they may yield to the inequalities of the board; and my invention also consists in the method of straining the saw by means of two stirrups, one secured to the end of the saw toward the back edge, and the other toward the front edge, and these two stirrups in turn being connected by a play-joint with a third or straining stirrup connected with the saw frame or gate.

The frame represented in the accompanying drawings is adapted to the purpose, but may be varied at pleasure. The saw-frame is much lighter and narrower than the ordinary one.

I strain the saw by the following contrivance: Instead of the common stirrup I use bolts, as at Figs. 1 and 6, which pass through the upper and lower girts of the gate, and are secured and strained by nuts. One end of the bolt is fastened and passes through a stirrup, *b*, Fig. 6, which rests on a pin passing through said bolt, as at *c*. The stirrup is susceptible of a vibratory as well as a lateral movement. At each end of this stirrup is another stirrup, in form of an inverted V, as at *d d*, resting on pins *e e*. These stirrups also may vibrate and move laterally by means of oblong holes, as at *a*, Fig. 7. The ends of stirrup *b* are open or split, so as to receive the end *a*, Fig. 7. The lower ends of the stirrups *d d* are also open or split, so as to receive the saw, of which *e* is a section. The holes in the saw and in the stirrups *d d* are to receive pins or rivets. By means of the oblong holes, as *a*, Fig. 7, the saw may have an equal strain, and by a lateral shift of stirrup *b* on the pin *e* the strain may be thrown on the front of the saw and give the saw more or less rake. By means of a bolt, as *a*, Fig. 6, passing through the center of each girt, not only the saw is kept in place, but the gate is kept in proper trim or balance and not allowed to twist or warp, and this construction requires much less weight of metal or material.

In addition to the straining apparatus already described for stiffening the saw, I use the following apparatus, similar to that described in Letters Patent granted to me June 7, 1838.

In order to be able to use a very thin saw, I make use of the following contrivance for keeping the saw true and preventing its running aside: Between the two center posts of the frame and at suitable height is placed the stock 11, Fig. 1, containing rollers 2 2, between which the saw moves. By regulating-screws these are kept in place. A grooved roller, 3, in front of the saw is used for the purpose of keeping the board from rising, and opposite to this and back of the saw is another like roller. (Not visible in the drawings.) 4 4 is a piece extending up from the stock, passing through a mortise or opening in the frame-piece 5 5 with the rack 6. In the frame-piece 5 5 is a pinion below 6, by which the rack is raised or lowered to regulate the height of the stock and rollers. On the right in the piece 4 4 is a series of holes, as $4^{\times}$ $4^{\times}$, to receive a pin to retain or hold up the piece 4, with the stock and rollers. Instead of a series of holes and a pin, a ratchet and hand may be used for this purpose. The ratchet may be on the shaft of the pinion which raises the rack. The cross part 7 7 is a horizontal extension of 4 4, sliding against the upright fender-posts, to keep the piece 4 4 and stock and rollers steady. There is also another stationary stock and rollers below the platform *b b* for the same purpose of regulating or steadying the saw. The rollers are out of view in Fig. 1, but represented in the sectional Fig. $1^{\times\times}$ of the platform *b b*.

To hold the board or plank to be sawed, I use the following apparatus: On the platform *b b*, Fig. 1, is a cross-slide platform or carriage, *c c*, which is moved laterally on the first platform by means of a set-screw, as at *d*, Fig. 1. On this platform *c c* are arranged the vertical rest or gage rollers *e e*, Figs. 1 and 2.

Figs. 1 and 2 are a metal frame to support the rollers, which in these figures are represented as being on one shaft, having the projecting bearings *g g g*, Fig. 2, and the lower bearings are in the platform *c c*, Figs. 1 and 2. There is another set of rollers at *i i i*, Figs. 1 and 2. These last also consist of two sets corresponding with the first set, *e e*. By the horizontal pieces *k k* the sets are connected, and they form bearings and supports for them. Through the pieces *k k* passes a shaft, *l*, which also passes through the lever *m*, which lever *m* has for its fulcrum the shaft *n n*, and this shaft *n n* is supported at the top by the frame *o o*. By an arrangement of holes or bearings *p p* the position of the shaft *n n* may be shifted to suit different thicknesses of timber. The shaft *l* is placed in the pieces or levers *k k*, so as to come sufficiently between the two sets of rollers *i i* to have a partial effect of the lever *m* on the rear rollers, or those which introduce the boards. The lower part of the shaft of the rollers passes down through a slot, *p*, in the slide *c c*. (See $q^{\times}$, Fig. 2.) The board, an end view of which is represented by the dots $L^2$, being placed between the rollers, then by means of the lever *m*, which possesses suitable elasticity, and the winch, drum, cord, and ratchet and hand, as at S S, Fig. 1, the rollers connected with the lever press the board against the rollers *e e*, and thus grip the board. The shaft of the rest or gage rollers *e e* passes through the platform *c c*, as seen at the right hand, *q*, Fig. 2. The lateral movement of the carriage *c c*, by means of the set-screw *d*, Fig. 1, is for the purpose of regulating the thickness to be cut, as the rollers in the frame *f f* are by this means thrown nearer to or farther from the plane of the saw. The rollers on each side of the board turn in toward each other to advance the board toward the saw, and the rollers on each side nearest the saw have the shafts extended down to the driving-wheels *t*, Figs. 1 and 2; and *u u u*, Figs. 1 and 2, is a framework which supports and holds the parallel parts V V of the shafts, which retain the same relative position to each other. This framework *u u* is supported by the timbers $u^{\times}$ and $V^{\times}$. As the rollers *e e* and *i i*, to accommodate different thicknesses of stuff, require either to approach to or recede from each other, it is requisite to use universal joints in the axles, as at $q^{\times}$ $q$ $q'$ $q'$, Fig. 2, W, Fig. 2, being the feeding-ratchet on the same shaft with the miter-wheel Z and W. Fig. 5 is a side view of the said feeding-ratchet with the pawl. *y* is the feeding-rod which moves the ratchet. The lower end of this feeding-rod rests on the horizontal piece or lever 1. This lever has a groove, (represented by the dots,) in which the tongued base of the feeding-rod rests. 2 is a cord attached to the rod and also to the end of a spring, 3, which may be of wood or metal of suitable length to give the requisite motion. 4 is a cord attached to the feeding rod or hand, which passes around a pulley, 5, and extends up to a fastening, 6, convenient to the tender. $6^{\times}$, Fig. 1, is the fastening. 7, Fig. 5, is a cord attached to the feeding-hand near the top, which extends downward to a horizontal spring, 8. The position and arrangement of parts represented by 2, 3, 4, 5, and 6 are to place and retain the hand *y* on any part of the lever on a portion of the frame of the mill. 10 is a roller in the end of lever 1, on which plays the eccentric-driver 11. The circle 12 represents the driving-pulley 12 of Fig. 1. 13, Fig. 5, is the shaft of the eccentric-driver 11, pulley 12, and fly 14, driven by wheel 15 and belt 16 of Fig. 1. 17 17, Fig. 1, is the connecting-rod between the crank-pin on the fly-wheel and the gate. To saw diagonally, the feeding-rollers at the right, as *a a a*, Fig. 3, are put in the position represented in this figure by means of universal joints between the rollers, made and mounted as represented at 1 2 in the sectional Fig. 4. *b b b*, Fig. 3, are pieces of stuff to be sawed, confined by the feeding-rollers.

The dotted lines represent the line of the cut of the saw.

Instead of three rollers, one above the other, more or less may be substituted.

From the foregoing it will be seen that the saw-gate is operated by crank motion in the usual manner, and that the saw, which should be thin for the purpose of resawing boards, is guided and kept true in its motions by the guide-rollers 2 2; but as no part of this arrangement makes part of my present invention other suitable arrangements may be substituted at the pleasure of the constructor. The board to be resawed or slitted is introduced between two sets of rollers, *e e* and *i i*, with one edge resting on the platform *b* of the frame, and its surface gripped between the two sets of rollers by drawing the lever *m*, which causes the rollers *i i* to operate as pressure-rollers. When thus gripped, the board is carried forward or fed to the edge of the saw by means of the rotating motion given to the rollers, thus constituting them at the same time feed-rollers, and while the board is acted upon by the saw it is prevented from being lifted up by passing under the rollers 3 3, the position of which is regulated to suit different widths of boards by the sliding and adjustable frame-work in which they are hung. In this way the board is fed forward to the saw and properly guided without the necessity of a back motion, as when the ordinary carriage is employed, and what is of great importance is that as the rollers are placed near to the saw the board is properly presented and guided whether it be straight or bent, the rollers *e e* always acting as a rest or guide, and as they have their bearings in a part of the frame or platform, which can be moved laterally by means of a screw or its equivalent, it will be seen that the thickness to which the board is to be reduced can be regulated at pleasure; and, in fact, if it be desired, this movement can be given during the operation of the saw, to reduce the board to varying thicknesses. The two sets of rollers being connected with the gearing, which operates them by means of universal joints, they can be shifted laterally without the least affecting the gearing.

Instead of making the rollers in sections, they can be made each in one continuous piece; but when the machine is intended for sawing two or more boards at one time, and on a bevel, as represented in Fig. 3, then they must be made in sections, with the shafts connected by universal joints, as described above. Instead of feeding the board forward by means of the two sets of rollers, this may be done by other means, such as an endless chain or even a reciprocating carriage; but it will be found more advantageous under all circumstances to feed by means of the rollers, and when so employed either both or only one set need be geared. When the board is fed by means other than the rollers, they (the rollers) act simply for the purpose of presenting, gaging, and guiding it to the edge of the saw.

It will be obvious from the foregoing that the pressure-rollers *i i* may be operated to make pressure against the surface of the board by any known means other than levers, although I prefer levers, and that the rollers *e e* may be made adjustable or stationary at pleasure, although if made stationary the machine will not be adapted to the resawing of boards to various thicknesses unless the saw be made adjustable instead of the rollers. The number of rollers may be increased or decreased at pleasure.

What I claim as my invention, and desire to secure by Letters Patent, is—

1. The method of presenting, gaging, or guiding the board by means of the rest and pressure rollers, or their equivalents, substantially as herein described, in combination with the saw, substantially as described.

2. The method, substantially as herein described, of hanging and straining the saw by the combination of the three stirrups at the ends of the saw, constructed and connected in manner substantially as herein described.

PEARSON CROSBY.

Witnesses:

J. CHASE TABER,

A. P. BROWN.